(12) United States Patent
Sarawat et al.

(10) Patent No.: US 8,659,992 B2
(45) Date of Patent: Feb. 25, 2014

(54) NETWORK ADDRESS TRANSLATION

(75) Inventors: Vikas Sarawat, Broomfield, CO (US); Christopher Grundemann, Castle Rock, CO (US); Karthik Sundaresan, Boulder, CO (US); Christopher J. Donley, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 114 days.

(21) Appl. No.: 13/372,899

(22) Filed: Feb. 14, 2012

(65) Prior Publication Data
US 2013/0208597 A1 Aug. 15, 2013

(51) Int. Cl.
*H04J 1/00* (2006.01)
(52) U.S. Cl.
USPC .......................................... 370/216; 370/465

(58) Field of Classification Search
USPC ............... 370/216–228, 465, 466; 726/11–15
See application file for complete search history.

(56) References Cited

U.S. PATENT DOCUMENTS

2004/0165602 A1* 8/2004 Park et al. ..................... 370/401
2010/0254255 A1* 10/2010 Devarapalli ................... 370/216

* cited by examiner

*Primary Examiner* — Pao Sinkantarakorn
(74) *Attorney, Agent, or Firm* — Great Lakes Intellectual Property, PLLC.

(57) ABSTRACT

Address translation sufficient for use in translating addresses included in messages carried or otherwise transmitted between inside and outside network is contemplated. The contemplated address translation may facilitate operation of a network address translator (NAT), carrier grade network address translator (CGN), or other device similarly configured to facilitate translating inside addresses used to address messages carried over the inside network relative to outside addresses used to facilitate carrying messages over the outside network.

19 Claims, 3 Drawing Sheets

NETWORK ADDRESS TRANSLATION

TECHNICAL FIELD

The present invention relates to facilitating network address translation, such as but not necessarily limited to facilitating network address translation of inside and outside network addresses associated with communicating between inside and outside networks.

BACKGROUND

Internet Protocol (IP) is a computer network protocol (analogous to written and verbal languages) that all machines on the Internet must know in order to communicate with one another, i.e., IP is a layer 3 (network layer) protocol in the Open Systems Interconnection (OSI) model. The vast majority of IP devices support IP version 4 (IPv4) defined in RFC-791, the disclosure of which is hereby incorporated by reference in its entirety, and IP version 6 (IPv6) defined in RFC-2460, the disclosure of which is hereby incorporated by reference in its entirety. Devices relying on IP may be assigned an IP address (e.g., an IPv4 and/or an IPv6 address). The IP address and/or other addresses assigned to the IP and non-IP devices (MAC address, etc.) may be designated as being globally and/or locally unique addresses depending on whether the address is limited to uniquely identify a device on a private or inside network or whether the address is able to uniquely identify the device on the Internet or other global/public network.

A globally unique address may be assigned by a global tracking entity or other regulatory entity responsible for ensuring addresses are assigned to no more than one device. The global tracking entity may make this determination of global uniqueness based on all devices requesting or being allocated addresses for use over the Internet or other global/public network. A locally unique address, in contrast, may be assigned by a network administrator or other device tasked with ensuring addresses uniqueness across a more limited environment, such as over a local or private network that is independent of the Internet or other global/public network for which the globally unique addresses are assigned. Networks relying on locally unique addresses may be referred to as inside networks and the addresses relied upon to communicate over the network may be referred to as insides addresses. Similarly, the Internet or other global/public network may be referred to as an outside network and the addresses relied upon to communicate over the network may be referred to as outside addresses.

Devices connected to the inside network, referred to as inside devices, may rely upon inside addresses when addressing messages for communication with other similarly connected inside devices. The inside devices, however, may require an outside addresses in order to properly communicate with devices connected to the outside network, referred to as outside devices. This may be required since the assigned inside addresses may not uniquely identify the inside devices over the outside network (i.e., in the event the inside address is used by another outside device, messages specifying the inside address and intended for the inside address would be undesirably transmitted to the outside device). A network address translator (NAT), a carrier grade NAT (CGN), or other sufficiently configured translation device may be used to provide the inside device with an outside address sufficient to facilitate message exchange or other address dependent communications with the outside devices.

The translation devices may be configured to facilitate a translation or mapping operation where the inside addresses associated with the inside devices desiring to transmit over the outside network are assigned or otherwise associated with an outside address sufficient to facilitate the desired communication. In some cases, the translation device may be assigned a limited number of outside addresses, which may be less than the number of outside addresses required to support communications for the number of inside devices associated therewith. The translation device may become overloaded if the number of devices requesting outside addresses exceeds the number of available outside addresses. This can result in the corresponding communications being ignored by the translation device and/or other disruptions in service, which may be detrimental to service providers or other entities tasked with ensuring operation of the inside devices.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
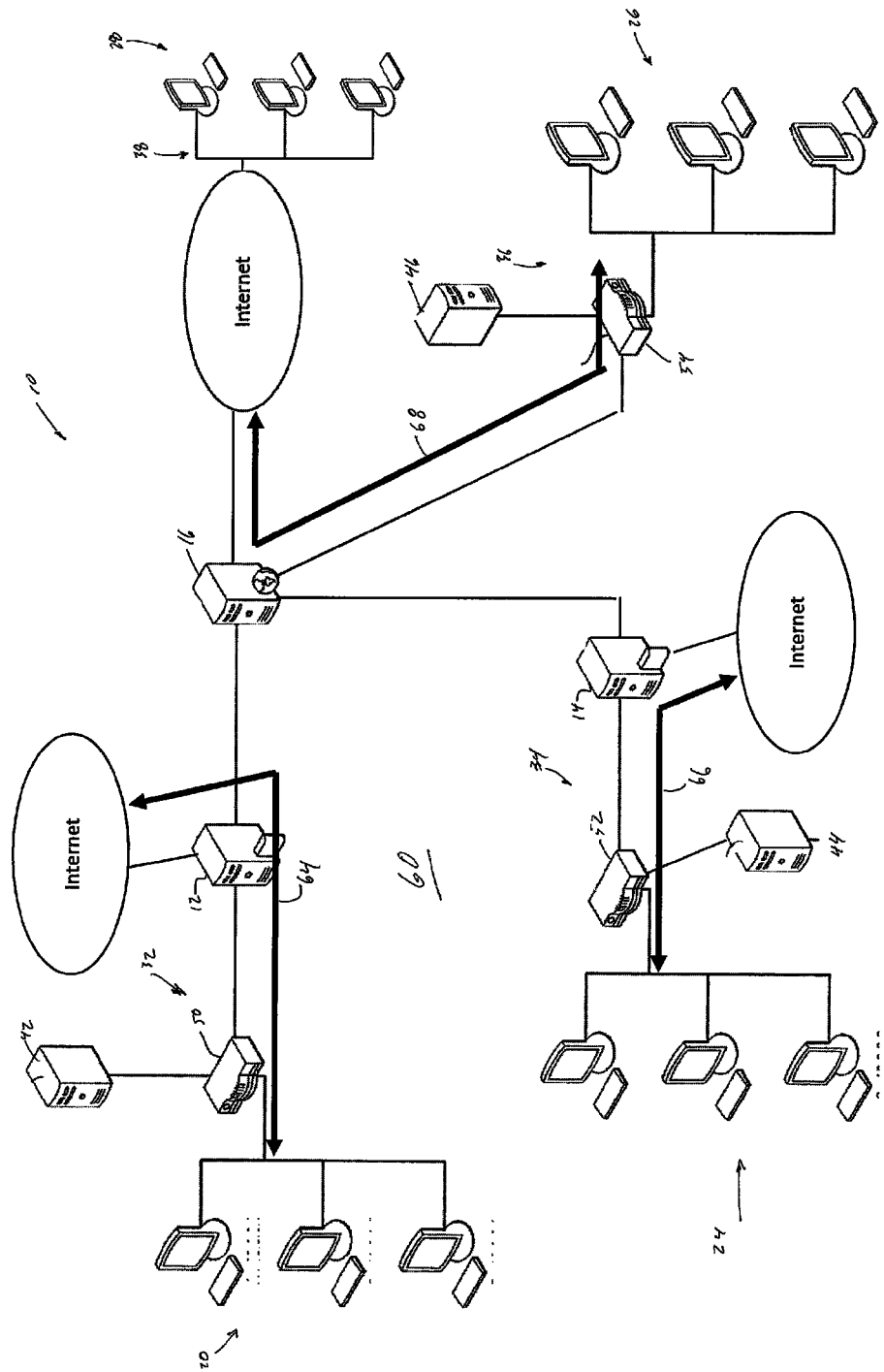
FIG. 1 illustrates a network address translation system as contemplated by one non-limiting aspect of the present invention.

FIG. 1 illustrates a network address translation system 10 as contemplated by one non-limiting aspect of the present invention. The system 10 may be configured and operated as described herein to facilitate continued network address translation when translation devices experience overload conditions or other situations in which they may be unable to provide outside network addresses. The system 10 is predominately described with respect to the use of a first, second, and third translators 12, 14, 16 to facilitate connecting a first, second, and third plurality of inside devices 20, 24, 26 with a plurality of outside devices 28. The first, second, and third translators 12, 14, 16 may be network address translators (NAT), a Carrier Grade Network Address Translator (CGN), or other sufficiently configured translator, including but not limited to those associated with and having the configurations and capabilities described in U.S. patent application Ser. Nos. 13/232,509 and 13/288,334, the disclosures of which are hereby Incorporated by reference in their entirety.

The first, second, and third translators 12, 14, 16 are described for exemplary non-limiting purposes as one type of translator operable to facilitate multiplexing a larger pool of network addresses (inside network addresses) across a smaller pool of network addresses (outside network addresses). The present invention, however, fully contemplates its use and application with any system and is not particular limited to a CGN-based system or translators of the type that facilitate multiplexing a larger pool of network addresses across a smaller pool of network addresses, i.e., the translators 12, 14, 16 may be any device sufficiently configured in accordance with the present invention to translate network addresses. The first, second, and third translators 12, 14, 16 may be used to define boundaries associated with a first inside network 32, a second inside network 34, and a third inside network 36 and an outside network 38. DHCP servers 42, 44, 46 may be included to facilitate address assignment and other network maintenance related operations for each of the inside networks 32, 34, 36 (less DHCP servers may be used).

The inside networks 32, 34, 36 may correspond with a particular geographical location or other area supported by a router or similar type of device (a cellular tower, a satellite, etc.) 50, 52, 54. Depending on the router and/or the configuration inside networks 32, 34, 36, the inside networks 32, 34, 36 may be associated with a home network or other local network. The outside network 38 may correspond with the Internet or some other network unbound to the inside networks 23, 34, 36, e.g., the Internet. The inside and outside devices 20, 24, 26, 28 may be any type of device capable of supporting IP-based and non-IP-based communications and/or connections. The devices 20, 24, 26, 28, for example, may be any type of terminal sufficient for rendering electronic content, such as but not limited to a set-top box (STB), a television, a computer (desktop, laptop, tablet, PDA, etc.), a mobile phone, a media terminal adapter (MTA), a digital video recorder (DVR), etc. The devices 20, 24, 26, 28 may include a display or other output through which with the content may be rendered. The devices 20, 24, 26, 28 may include a user interface or other feature to facilitate interacting with a user thereof, such as to facilitate selection and use of the content. The devices 20, 24, 26, 28 may include a memory, a processor, and other elements necessary to facilitate communications and other operations associated with the present invention.

The inside and/or outside networks 32, 34, 36, 38 may be associated with any type of electronic medium through which signals may be exchanged between one or more of the devices 20, 24, 26, 28. The networks 32, 34, 36, 38 may be any type of wireline or wireless network, or combination thereof, such as but not limited to a cable television network, a cellular network, a Wi-Fi network, an optical network, etc. The content and/or other types of data carried over the networks 32, 34, 36, 38 may be any type of electronic content suitable for electronic transmission, such as but not limited to video, audio, or some combination thereof. One of the outside devices 28 may be a website or a content source associated with a service provider, for example, a cable television service provider, a broadcast television service provider, a satellite television service provider, a multiple system operator (MSO), a streaming video/audio server/service, a home media gateway, or any other entity operable to facilitate transmission of selectable versions of available content.

The exemplary description of separate first, second, and third inside networks 32, 34, 36 is provided to highlight one non-limiting aspect of the present invention where the first, second, and third network address translators 12, 14, 16 are tasked with facilitating corresponding inside and outside network address translations with the corresponding connected inside devices 20, 24, 26. The present invention, of course, is not necessarily limited to this configuration and particulate contemplates one or more of the inside networks 32, 34, 36 being part of the same network, e.g., the first and second inside networks 32, 34 may be part of a third, larger network 60 where a single DHCP server other network administration device is responsible for managing network communications of both of the first and second inside networks 32, 34. The third inside network 60 is illustrated for exemplary purposes to highlight one scenario contemplated by the present invention where the third inside network 60 is supported directly by the third network address translator 16.

The first and second inside networks 32, 34 are shown to include the first and second network address translators 12, 14 acting as intermediaries between the corresponding first and second inside networks 32, 34 and the third network address translator 16. The present invention contemplates such an arrangement where the third network address translator 16 is considered as a regional network address translator and the first and second network address translators 12, 14 are considered as local network address translators. This may occur, for example, in the event the local network address translators 12, 14 are assigned to certain geographical areas and the regional network address translator 16 is assigned to a larger geographical area encompassing the first and second geographical areas associated with the first and second inside networks 32, 34. The third network address translator 16 may similarly support a third geographical area associated with the third inside network 36.

The ability of the third network address translator 16 to support the third inside network 36 may differ from the support of the first and second inside networks 32, 34. The third network address translator 16 may interact directly with the devices 26 associated with the third inside network 36, as opposed to communicating with an intermediary type of network address translator, e.g., like one of the first and second network address translators 12, 14. The devices 20, 24 associated with the first and second inside networks 32, 34 may be required to communicate through the corresponding first and second network address translators 12, 14 in order to reach the third network address translator 16 whereas the devices 26 of the third inside network 36 may communicate directly with the third network address translator 16. This type of arrangement may be beneficial in rural environments where the cost to provide a dedicated local network address translator analogous to the first and second network address translators 12, 14 may be undesirable due to limited traffic flow.

FIG. 1 illustrates exemplary first, second, and third traffic flows 64, 66, 68 when the corresponding first, second, and third network address translators are experiencing non-overload conditions and one or more devices 20, 24, 26 desire communication over the Internet. The traffic flows 64, 66, 68 are intended to represent connections, messages, and other communications between the inside devices 20, 24, 26 and outside devices 28. Each inside device 20, 24, 26 desiring such communications may be assigned an outside network address by one of the translators 12, 14, 16 for a period of time sufficient to perform the desired communication with the outside device 28. The outside addresses used to facilitate the communication may correspond with one of a certain number of outside network addresses made available to the associated network address translator 12, 14, 16. Each of the network address translators 12, 14, 16 may be allocated a certain plurality of available outside network addresses for use by one or more of the inside devices 20, 24, 26 associated therewith. The first network address translator 12 may be allocated a first plurality of outside network addresses, the second network address translator 14 may be allocated a second plurality of outside network addresses, and the third network address translator 16 may be allocated a third plurality of outside network addresses.

Figure 2:
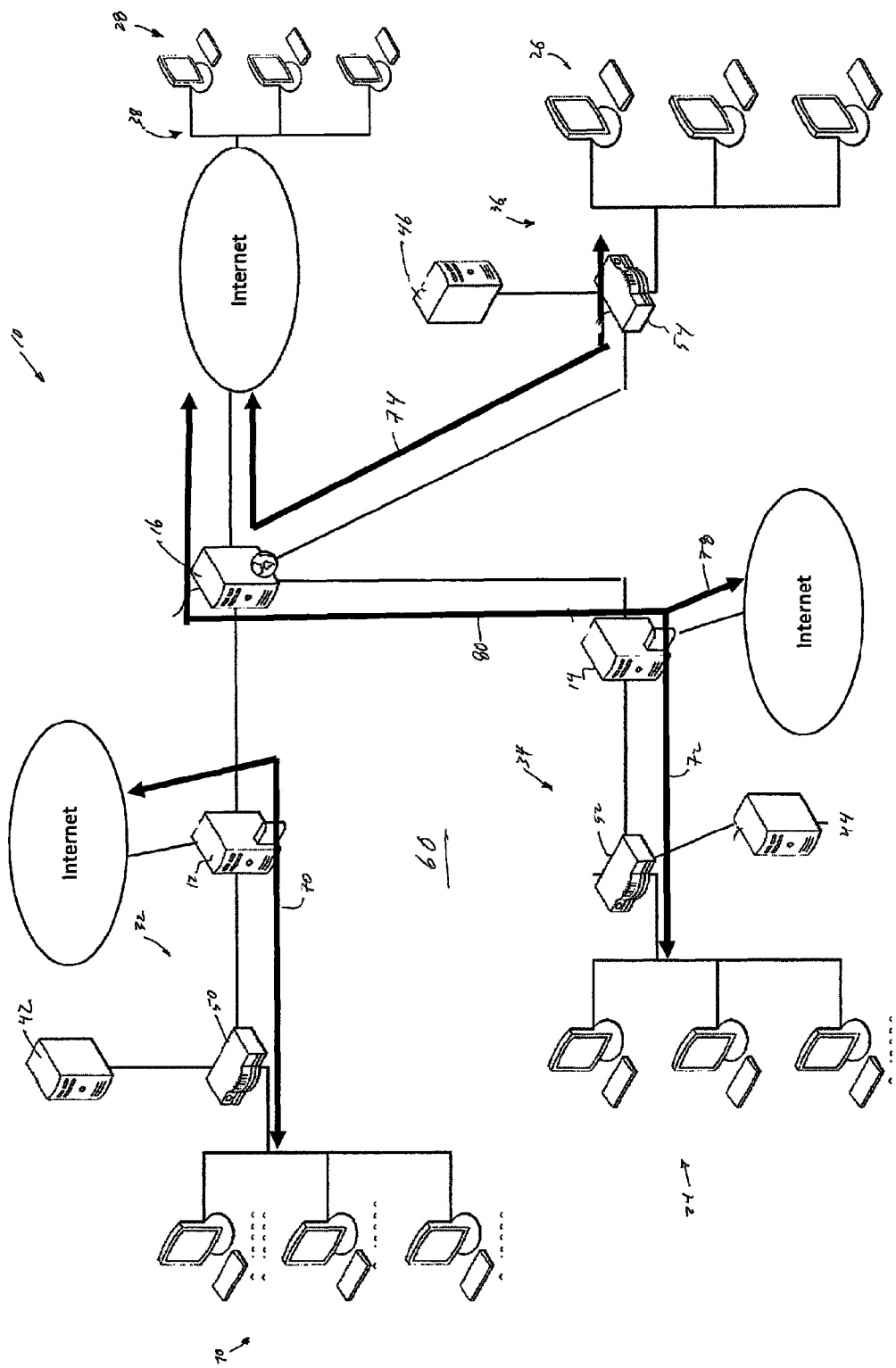
FIG. 2 illustrates traffic flows during an overload condition as contemplated by one non-limiting aspect of the present invention.

FIG. 2 illustrates a first, second, and third traffic flows 70, 72, 74 during an overload condition as contemplated by one non-limiting aspect of the present invention. The overload condition may relate to the second network address translator 14 being requested to allocate more outside network addresses than it has been allocated and/or the second network address translator 14 experiencing some other condition which would prevent it from facilitating network address translations of the type required to support allocation of the outside network addresses to a desiring one or more of the inside devices. The first and third traffic flows 70, 74 may correspond with the first and third translators 12, 16 experiencing non-overloaded conditions. The second traffic flow 72 is shown to include a first portion 78 and a second portion 80. The first portion 78 may correspond with non-overload communications or non-overload messages supported by the second network address translator 14 directly with the outside network, i.e., in the manner described above with respect to FIG. 1.

The second portion 80 may correspond with overload communications or overload messages supported by and/or through the second network address translator 14. The overload messages associated with the second portion 80 may be translated using the third network address translator 16 in order to facilitate allocating a sufficient outside network address. The outside network address translated to the overload messaging may correspond with one or more of the third plurality of outside network addresses allocated to the third network address translator 16. In this manner, the present invention contemplates addressing an overload condition at the second network address translator 14 when the second network address translator 14 has run out of its available number of the second plurality of outside network addresses such that further communications are facilitated with reliance on the third plurality of network addresses associated with the third network address translator 16.

The overload messages associated with the second portion 80 of the second traffic flow 72 may be communicated from the second network address translator 14 to the third network address translator 16 in a pass-through operation. The pass-through operation may correspond with the second network address translator 14 simply relaying the corresponding overload messages to the third network address translator 16, e.g., without performing network address translation between inside network addresses and outside network addresses. Optionally, a tunnel or other transport mechanism may be established between the second and third network address translators 14, 16 to facilitate exchanging the overload messages. The second network address translator 14 may include a switch or other device to facilitate passing the overload messages to the third network address translator 16. While the present invention is described with respect to the third network address translator 16 being a backup translator charged with facilitating operations of the second network address translator 14 during an overload condition, the present invention fully contemplates the second network address translator 14 relying on the first network address translator or some other network address translator to achieve similar operations during an overload condition.

Optionally, anyone of the first, second, and third network address translators 12, 14, 16 may be configured to rely on any one of the other network address translators 12, 14, 16 to facilitate network address translation of overload messaging. The selection of the desired one or more of the first, second, and third network address translators 12, 14, 16 to be used as a backup translator, i.e., the transit responsible for processing overload messages associated with an overload one of the other network address translators, may be determined by a network administrator (not shown) and/or by the first, second, third, or additional network address translators 12, 14, 16. The network address translators 12, 14, 16 may include an algorithm or other selection process sufficient for identifying the appropriate backup translator. This may include, for example, the overloaded network address translator identifying the least overloaded one of the available other network address translators 12, 14, 16 as the backup translator and/or reviewing other metrics to facilitate identifying the most appropriate one of the other network address translators to be used as the backup translator.

The overload messages need not necessarily be relayed to the backup translator in a pass-through operation, at least in a pass-through operation of the type where the overload messages are required to pass through the overloaded network address translator. With respect to the exemplary description of the second network address translator 14 being overloaded, the corresponding overload messages may be transmitted directly from one of the inside devices 24 and/or the router 52 to the third network address translator 16, i.e., without passing through the second network address translator 14. This may occur in the event the first and second inside networks 32, 34 are part of a larger, third inside network 60 associated with the third network address translator 16 such that communications can take place therebetween without having to pass-through the second network address translator 14. With this scenario, the third network address translator 16 may be considered as an inside device associated with the second inside network 34 such that communications can take place between the third network address translator 16 and the inside devices 24 of the second inside network 34 without requiring network address translation.

The network address translators 12, 14, 16 associated with facilitating communication of overload messages, which in the exemplary illustration FIG. 2 corresponds with the second network address translator 14 and the third network address translator 16, may be configured to maintain state information or other address related information for the overload transactions. The state information may be used to keep track of the appropriate network address translator 12, 14, 16 through which the overload messages may be passed in order to ensure proper communication connections between the associated inside device 20, 24, 26 and outside device 28. The state information may be used to facilitate communication of response messages generated by the outside devices 28 in response to the overload messages or otherwise directed to one of the outside address assigned to by one of the translators 12, 14, 16. The response messages may be addressed to the outside address applied by the backup translator 16 such that the backup translator 16 may be required to identify from the state information whether the response message can be communicated directly to the inside device 24 associated with the outside address of the response message or to the second network address translator 14.

The present invention contemplates a scenario where the second network address translator 14, or other overloaded translator, may be required to perform some network address translation in order to facilitate delivery of the overload messages to the third network address translator 16, or other backup translator. The network address translation may be considered as backup network address translation at least in that the inside network addresses associated with the overload messages may be translated by the second network address translator 14 to a backup network address associated with the backup translator, i.e., a third network address translator address associated with the third network address translator 16. This type of backup address translation may be required in the event the backup network address translator is tasked with being available as a backup translator for a plurality of network address translators where it may be difficult or impossible to subsequently identify the overloaded network address translator to which a response message is to be delivered.

Figure 3:
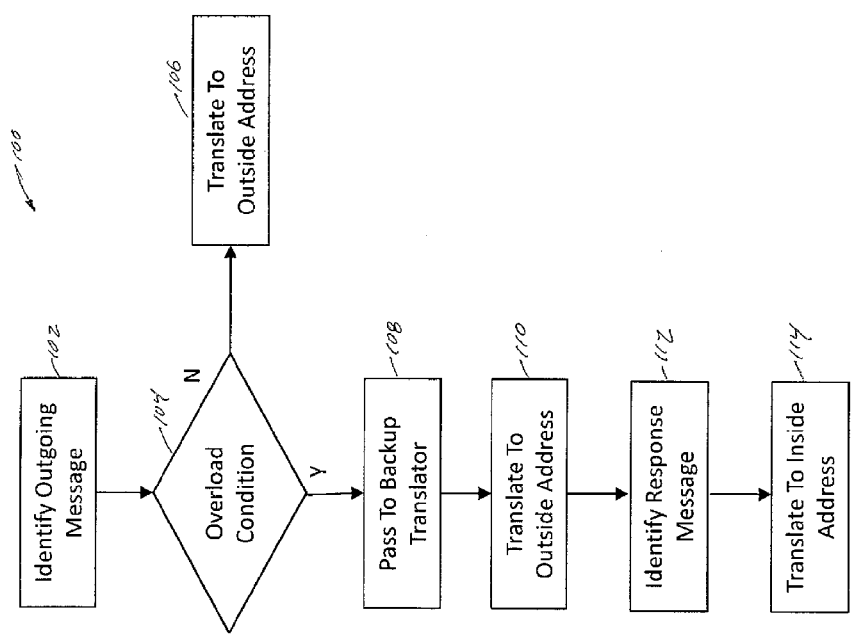
FIG. 3 illustrates a flowchart for a method of network address translation as contemplated by one non-limiting aspect of the present invention

FIG. 3 illustrates a flowchart 100 for a method of network address translation as contemplated by one non-limiting aspect of the present invention. The method may be associated with a plurality of instructions stored on a computer-readable medium associated with one or more of the devices noted above that may cooperate with a processor other logically executing feature to facilitate the operations and process associated with the contemplated network address translation. The method is described for exemplary purposes with respect to facilitating network address translation between inside and outside networks, such as the inside and outside networks described above. The dichotomy between inside and outside network address, and their corresponding reliance on inside and outside network addresses, is provided for exemplary non-limiting purposes to demonstrate one use of the present invention with respect to supporting network address translation between networks that rely on locally unique addresses (e.g., the inside networks) and globally unique addresses (e.g., the outside network).

The exemplary description of the method is predominately described with respect to a network address translator (e.g., a NAT, CGN, or other translator) being configured to execute one or more of the processes of the method or otherwise being programmed with a corresponding software application. This description is provided without intending to unnecessarily limit the scope in contemplation the present invention to being embodied in a single network address translator or otherwise specifically relying on a network address translator to facilitate network address translation between inside and outside addresses as the present invention fully contemplates the use of virtually any type of transition device and virtually any type of translation between inside, outside, or other address designations. Accordingly, the steps and/or processes associated with the method may be implemented with a network address translator and/or a software application configured to facilitate translation operations of the network address translator or other device associated with achieving the contemplated network address translations.

Block 102 relates to identifying an outgoing message requiring network address translation between an inside network address and an outside network address. The message may be identified with a first network address translator responsible for facilitating communication of the message over the Internet receiving the message from an inside device associated therewith. The first network address translator may be configured to process the outgoing message and to identify whether the outgoing message requires an outside address. Block 104 relates to identifying the outgoing messages requiring an outside address and the first network address translator determining whether an overload condition exists. Overload conditions may correspond with the first network address translator exceeding its maximum number of outside addresses such that it is unable to provide the outgoing message with an outside network address and/or some other condition at the first network address translator preventing it from facilitating translation to an outside network address.

Block 106 relates to a non-overload condition where the first network address translator is currently capable of facilitating translation of inside network address included within the outgoing message to one of a plurality of outside network addresses associated with the first network address translator. The first network address translator may translate the outside network address of the outgoing message by replacing the inside network address included within the outgoing message with the outside network address and/or by performing some other operation sufficient to facilitate associating the outside network address with outgoing message in a manner sufficient to facilitate communicating outgoing message or otherwise establishing the desired communication or connection between the inside device and an outside device intended to receive the outgoing message. The first network address translator may be required to store state information for the translation in order to facilitate subsequent processing of response messages generated in response to the outgoing message.

Block 108 relates to an overload condition being determined such that the first network address translator is unable to properly assign an outside network address to the outgoing message. The first network address translator may be configured to execute a pass-through operation to facilitate passing the outgoing message to a backup translator having capabilities sufficient to assign a proper outside network address. As noted above, the pass-through operation may include, but is not necessarily limited to, the first network address translator passing the outgoing message to the backup translator without performing address translation, the first network address translator causing the inside network address of the outgoing message to be temporally translated to a network address of the backup network address translator so that the outgoing messages transmitted to the backup network address translator, and/or the inside device sourcing the outgoing message directly to the backup network address translator.

Block 110 relates to the backup network address translator receiving the outgoing message and translating the inside network address included therein (which may be the inside network address associated with the device sourcing the outgoing message or the inside address assigned by the first network address translator). The inside network address may be translated to one of a plurality of outside network addresses allocated to the backup translator. The network address may be translated to the outside network address in a manner similar to that described above with respect to Block 106. Block 112 relates to the network address translator associated with the outgoing message receiving a response message sent to a corresponding outside address. The response message may be received by the first network address translator in the event the outgoing message was output to the outside network by the first network address translator or received by the backup network address translator in the event the outgoing message was not sourced by the first network address translator and instead source by the backup translator.

Block 114 relates to translating the outside network address specified in the response message to the appropriate inside address. The address may be translated in a manner sufficient to facilitate delivery of the corresponding response message to the inside device previously associated with the outside network address. This may be accomplished by either one of the first network address translator and the backup network address translator reviewing state information and/or communicating messages between each other to identify the appropriate inside network address of the inside device intended to receive the response message. In the event the response message must be passed through the first network address translator, i.e., the backup translator is unable to correctly transmit the response message to the inside devices which may occur if the backup translator is only aware of the first network address translator and not the inside device sourcing outgoing message, a temporary translation may occur in order to facilitate communicating the response message from the backup translator to the first network address translator or other translator associated with the appropriate inside address.

As supported above, one non-limiting aspect of the present invention contemplates a NAT or CGN device which allows for hierarchy by overloading to a bridged state for additional flows beyond its capacity. This may include the CGN system forwarding any new flows beyond its capacity to another CGN box which most likely may be located in the core of the network in order to allow the operators to engineer their regional and edge CGN boxes for the median traffic load so that the extra traffic during peak hours can be routed to the CGN in the core of the network. This capability may be particularly beneficial in the event the network address translators associated with the NAT or CGN system supports a limited number of NAT flows, at least in that it would alleviate the overloaded network address translator from rejecting flows beyond this number would, or if accepted, would affect the service quality for all the existing flows in an un-deterministic manner.

One non-linking aspect of the present invention contemplates a scenario where a NAT box supports 1000 flows (due to hardware limitations or number of configured outside addresses, etc., however, this number could be much larger) and all 1000 flows are currently in use. In the event traffic for a 1001 flow shows up at the NAT, rather than rejecting the traffic, the present invention contemplates the NAT instead of performing a NAT function on the 1001 the flow by routing the traffic associated with 1001 flow to another NAT.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A network address translation system operable with a plurality of devices to translate network addresses between inside and outside network addresses, the system comprising:
a first network address translator (NAT) configured to translate a first plurality of inside addresses associated with a first plurality of messages relative to a first plurality of outside addresses, the first plurality of inside addresses addressing the first plurality of messages relative to the devices when carried over a first inside network, the first plurality of outside addresses addressing the first plurality of messages relative to the devices when carried over an outside network;
a second NAT configured to translate a second plurality of inside addresses associated with a second plurality of messages relative to a second plurality of outside addresses, the second plurality of inside addresses addressing the second plurality of messages relative to the devices when carried over a second inside network, the second plurality of outside addresses addressing the second plurality of messages relative to the devices when carried over the outside network;
wherein, in the event the first NAT experiences an overload condition:
i) the first NAT translates the first plurality of inside addresses of overload messages relative to a second NAT address sufficient to address the overload messages to the second NAT, the overload messages being messages received by the first NAT while the overload condition is being experienced; and
ii) the second NAT translates the second NAT address of the overload messages relative to the second plurality of outside addresses;
wherein the first NAT translates the first plurality of outside addresses associated with each of a first plurality of responses generated in response to the first plurality of messages to the first plurality of inside address associated therewith;
wherein the second NAT translates the second plurality of outside addresses associated with each of a second plurality of responses generated in response to the second plurality of messages to the second plurality of inside addresses associated therewith;
wherein the second NAT translates the second plurality of outside addresses associated with each of a third plurality of responses generated in response to the overload messages to a first NAT address of the first NAT; and
wherein the first NAT translates the first NAT address of the third plurality of responses to the first plurality of inside addresses associated therewith.

2. The network address translation system of claim 1 wherein the first NAT experiences the overload condition when a number of the first plurality of messages requiring network address translation exceeds an available number of the first plurality of outside network addresses.

3. The network address translation system of claim 1 wherein the second NAT address is one of the second plurality of inside addresses.

4. The network address translation system of claim 1 wherein the first plurality and second plurality of inside network addresses are locally and not globally unique and the first and second plurality of outside network address are globally unique.

5. The network address translation system of claim 4 wherein at least one of the first and second plurality of inside network address conflicts with at least one or more of the first and second plurality of outside network address.

6. The network address translation system of claim 4 wherein the first and second inside networks comprise at least parts of a third inside network.

7. A network address translation system operable with a plurality of devices to translate network addresses between inside and outside network addresses, the system comprising:
a first network address translator (NAT) configured to translate inside addresses relative to a first plurality of outside addresses, the inside addresses addressing messages relative to the devices when carried over an inside network, the first plurality of outside addresses addressing messages relative to the devices when carried over an outside network;
a second NAT configured to translate the inside addresses relative to a second plurality of outside addresses, the inside addresses addressing messages relative to the devices when carried over the inside network, the second plurality of outside addresses addressing messages relative to the devices when carried over the outside network; and
wherein, in the event one of the first and second NAT experiences an overload condition (overloaded NAT) and the other one of the first and second NAT is not experiencing an overload condition (non-overloaded NAT):
i) the overloaded NAT directs overload messages to the non-overloaded NAT for network address translation, the overload messages being messages received by the overloaded NAT while the overload condition is being experienced; and ii) the non-overloaded NAT translates the inside addresses of the overload messages relative to the second plurality of outside addresses.

wherein the first NAT translates the first plurality of outside addresses associated with each of a first plurality of responses generated in response to the first plurality of messages to the first plurality of inside addresses associated therewith;

wherein the second NAT translates the second plurality of outside addresses associated with each of a second plurality of responses generated in response to the second plurality of messages to the second plurality of inside addresses associated therewith;

wherein the second NAT translates the second plurality of outside addresses associated with each of a third plurality of responses generated in response to the overload messages to facilitate transmission to the first plurality of inside addresses associated therewith;

wherein the second NAT translates the second plurality of outside addresses associated with each of the third plurality of responses directly to the first plurality of inside addresses associated therewith in the event the overload messages were directed to the second NAT in a pass-through operation; and wherein the second NAT translates the second plurality of outside addresses associated with each of the third plurality of responses to a first NAT address of the first NAT in the event the overload messages were addressed to a second NAT address of the second NAT.

8. The network address translation system of claim 7 wherein the overloaded NAT performs a pass-through to direct the overload messages to the non-overloaded NAT.

9. The network address translation system of claim 8 wherein the pass-through is performed without the overloaded NAT translating inside address associated with the overload messages prior to receipt by the non-overloaded NAT.

10. The network address translation system of claim 7 wherein the overloaded NAT translates the inside addresses of the overload messages relative to a non-overloaded NAT address sufficient to address the overload messages to the non-overloaded NAT, the non-overloaded NAT address being the inside address translated by the non-overloaded NAT relative to the second plurality of outside addresses.

11. The network address translation system of claim 7 wherein the overload condition corresponds with a number of messages requiring network address translation by the overloaded NAT exceeding a number of outside network addresses available to the overloaded NAT.

12. The network address translation system of claim 7 wherein the inside addresses are unique to the inside network and not unique to the outside network.

13. The network address translation system of claim 7 wherein the inside network addresses are locally unique to the inside network and not globally unique and the first and second plurality of outside network addresses are globally unique to the outside network.

14. A non-transitory computer-readable medium having instructions stored thereon, operable with a processor, to facilitate translating network addresses between inside and outside network addresses for a plurality of devices, the non-transitory computer-readable medium comprising instructions sufficient for:

instructing a first network address translator (NAT) to translate a first plurality of inside addresses associated with a first plurality of messages relative to a first plurality of outside addresses, the first plurality of inside addresses addressing the first plurality of messages relative to the devices when carried over a first inside network, the first plurality of outside addresses addressing the first plurality of messages relative to the devices when carried over an outside network;

instructing a second NAT to translate a second plurality of inside addresses associated with a second plurality of messages relative to a second plurality of outside addresses, the second plurality of inside addresses addressing the second plurality of messages relative to the devices when carried over a second inside network, the second plurality of outside addresses addressing the second plurality of messages relative to the devices when carried over the outside network;

wherein, in the event the first NAT experiences an overload condition, instructing:

i) the first NAT to translate the first plurality of inside addresses of overload messages relative to a second NAT address sufficient to address the overload messages to the second NAT, the overload messages being messages received by the first NAT while the overload condition is being experienced; and ii) the second NAT to translate the second NAT address of the overload messages relative to the second plurality of outside addresses.

instructing the first NAT to translate the first plurality of outside addresses associated with each of a first plurality of responses generated in response to the first plurality of messages to the first plurality of inside address associated therewith;

instructing the second NAT to translate the second plurality of outside addresses associated with each of a second plurality of responses generated in response to the second plurality of messages to the second plurality of inside addresses associated therewith;

instructing the second NAT to translate the second plurality of outside addresses associated with each of a third plurality of responses generated in response to the overload messages to a first NAT address of the first NAT; and instructing the first NAT to translate the first NAT address of the third plurality of responses to the first plurality of inside addresses associated therewith.

15. The computer-readable medium of claim 14 further comprising instructions sufficient for determining the first NAT to be experiencing the overload condition when a number of the first plurality of messages requiring network address translation exceeds an available number of the first plurality of outside network addresses.

16. The computer-readable medium of claim 14 further comprising instructions sufficient for determining the second NAT address as one of the second plurality of inside addresses.

17. The computer-readable medium of claim 14 further comprising instructions sufficient for determining the first plurality and second plurality of inside network addresses to be locally and not globally unique and the first and second plurality of outside network address to be globally unique.

18. The computer-readable medium of claim 17 further comprising instructions sufficient for instructing the first NAT and the second NAT when at least one of the first and second plurality of inside network address to conflict with at least one or more of the first and second plurality of outside network address.

19. The computer-readable medium of claim 17 further comprising instructions sufficient for instructing the first NAT and the second NAT when the first and second inside networks comprise at least parts of a third inside network.

* * * * *